United States Patent [19]

Matsunaga et al.

[11] 3,890,406

[45] June 17, 1975

[54] MODIFIED POLYPHENYLENE OXIDES CONTAINING PHOSPHORIC ACID ESTER-ANTIMONY TRIOXIDE FLAME RETARDING ADDITIVES

[75] Inventors: Hiroomi Matsunaga, Ashiya; Takuzo Okumura, Toyonaka; Isao Takata, Takatsuki; Teruo Saito, Osaka, all of Japan

[73] Assignee: Sumitomo Chemical Co., Ltd., Osaka, Japan

[22] Filed: Sept. 8, 1972

[21] Appl. No.: 287,559

[30] Foreign Application Priority Data

Sept. 9, 1971   Japan.............................. 46-70021
July 26, 1972   Japan.............................. 47-75423

[52] U.S. Cl. ...... 260/874; 260/45.7 P; 260/45.75 R; 260/876 R; 260/880; 260/893; 260/898
[51] Int. Cl. .... C08f 29/12; C08f 29/30; C08f 15/00
[58] Field of Search ............ 260/874, 876 R, 457 P, 260/880

[56] References Cited

UNITED STATES PATENTS

| | | | |
|---|---|---|---|
| 3,639,506 | 2/1972 | Haaf............................... | 260/876 R |
| 3,663,654 | 5/1972 | Haaf............................... | 260/876 R |
| 3,700,750 | 10/1972 | Yamanouchi et al.............. | 260/874 |
| 3,705,209 | 12/1972 | Matlack et al..................... | 260/874 |
| 3,761,541 | 9/1973 | Katchman et al.................. | 260/874 |

*Primary Examiner*—Murray Tillman
*Assistant Examiner*—Richard B. Turer
*Attorney, Agent, or Firm*—Stevens, Davis, Miller & Mosher

[57] ABSTRACT

A flame-retarded composition comprising 100 parts by weight a modified polyphenylene oxide, 0.5–10 parts by weight of a phosphoric acid ester having a boiling point of 200°C or higher and 0.2–5 parts by weight of antimony trioxide.

The composition has much improved flame resistance and is suitable for the use of electrical parts, industrial parts and construction material owing to its excellent moldability and good mechanical and thermal properties.

8 Claims, No Drawings

MODIFIED POLYPHENYLENE OXIDES CONTAINING PHOSPHORIC ACID ESTER-ANTIMONY TRIOXIDE FLAME RETARDING ADDITIVES

This invention relates to a modified polyphenylene oxide composition, and more particularly, it relates to a flame-retarded modified polyphenylene oxide composition.

The modified polyphenylene oxide is a very useful thermoplastic resin in industry, and its use has recently been developed remarkably as the so-called engineering plastic in the field of electrical parts, industrial parts and construction materials, owing to its characteristic properties, particularly an excellent moldability and a high impact strength as well as a high heat distortion resistance which has come from that inherent to the original polyphenylene oxide as it is not largely injured by the modification thereof.

As the application of synthetic resins to electrical parts, industrial parts and construction materials develops, there occurs frequently an accident caused by fire invited by the combustion of the synthetic resin moldings, which has offered a serious problem. Under such circumstance, the flame resistance test of synthetic resins tends to become more severe. Thus, a more severe test according to U.S. civil specification such as Underwriters Laboratory Subject 94 has frequently been used in place of the conventional ASTM-D635.

The modified polyphenylene oxide is graded as "self extinguishable" according to the ASTM-D635, but as "slow burning" according to the Underwriters Laboratory Subject 94 (hereinafter referred to as UL-94). Thus, it is indispensable to give a higher flame resistance to the modified polyphenylene oxide for the sake of fully utilizing its excellent properties in electrical parts, industrial parts and construction materials. This is quite important in order to develop the use of the modified polyphenylene oxide.

There are organic halogenide compounds and haloorgano phosphates as a commonly used flame-retarding material for the commonly used thermoplastic resins such as polypropylene and polystyrene. However, even when such conventional flame-retarding materials are added to the modified polyphenylene oxide, there results only in a molding lowered in mechanical and electrical properties. Furthermore, in view of a relatively high heat distortion temperature inherent to the modified polyphenylene oxide, the flame-retarding material must have such a decomposition temperature that it does neither decompose nor generate any bad smell in the molding procedure. Most of the said flame-retarding materials have a relatively low decomposition temperature at which toxic gas is generated. For instance, when an organic halide compound, Dechlorane plus 515 (Trade Mark of Hooker Chemical Co., U.S.A) is added to the modified polyphenylene oxide, there is revealed undesirable "silver-streak" in the molding article due to the decomposition of the compound in a high temperature molding. When haloorgano phosphates are used, it is necessary in order to increase the flame-resistance to use them in such a large amount that undesirable lowering of the softening point of the resin is caused.

Therefore, it is important to select not only an individual flame-retarding material but also a pertinent combination thereof taking into account of their kinds and amounts to be used, in order to make the modified polyphenylene oxide highly flame-resistant without lowering the mechanical and electrical properties thereof.

The object of the present invention is to provide a flame-retarded, modified polyphenylene oxide composition retaining a sufficient moldability, and the mechanical and electrical properties.

According to the present invention, there is provided a composition comprising 100 parts by weight of a modified polyphenylene oxide, 0.5 to 10 parts by weight of at least one phosphoric acid ester having a boiling point of 200°C or higher, of the formula

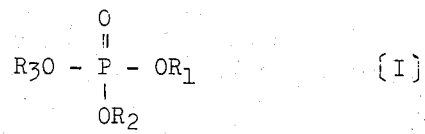

wherein $R_1$, $R_2$ and $R_3$ each are an aliphatic or aromatic hydrocarbon residue having 2 to 20 carbon atoms, and 0.2 to 5 parts by weight of antimony trioxide.

According to the present invention, the modified polyphenylene oxide can be rendered so highly flame-resistance as to be graded as the "Self-Extinguishing Test, Group I" according to the UL-94, and a molding having an excellent property in mechanical strength and thermal resistance is obtained from the flame-retarded polyphenylene oxide composition. Such an effect can never be given by adding any phosphoric acid ester alone.

The modified polyphenylene oxide to be flame-retarded is a member selected from the group consisting of a graft copolymer (1) which is obtained by polymerizing in a dispersed state a styrene-type monomer in the presence of a polyphenylene oxide with or without a rubbery polymer, a graft copolymer (2) which is obtained by oxidative-polymerizing a phenol compound in the presence of a styrene polymer, and a mixture obtained by blending 20–80 parts by weight of a polyphenylene oxide with 80–20 parts by weight of a styrene polymer.

The graft copolymer (1) is obtained by polymerizing in a dispersed state a minor amount of styrene-type monomer in the presence of a major amount of polyphenylene oxide polymer with or without a minor amount of rubbery polymer in an aqueous medium containing a solvent for the polyphenylene oxide, a surface active agent and a catalyst. The preparation of the graft copolymer (1) is disclosed, for example, in British Pat. No. 1,254,337 and Belgian Pat. No. 743,735.

The graft copolymer (2) is obtained by oxidative-polymerizing a phenol compound in the presence of a styrene polymer by using a well-known oxidative coupling polymerization initiator with or without a solvent. The preparation of the graft copolymer (2) is disclosed, for example, in Japanese Patent Publication No. 5113/1972 and Japanese Patent Application No. 36197/1972.

The phosphoric acid ester used in the present invention is represented by the formula [I] and has a boiling point of 200°C or higher under atmospheric pressure. Examples of the phosphoric acid ester are triethyl phosphate, tripropyl phosphate, tributyl phosphate, tripentyl phosphate, trihexyl phosphate, trioctyl phosphate, tridecyl phosphate, tridodecyl phosphate, trioctadecyl phosphate, triphenyl phosphate, tribenzyl phosphate, tricresyl phosphate, phenyl dipentyl phosphate, diphenyl pentyl phosphate, cresyl diphenyl phosphate, octyl diphenyl phosphate and others.

The polyphenylene oxide used in the present invention has a structural unit represented by the general formula.

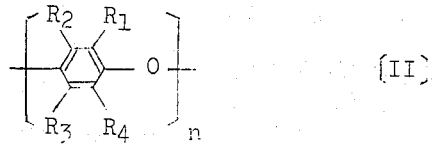

wherein $R_1$, $R_2$, $R_3$ and $R_4$ are individually hydrogen or halogen atoms, or hydrocarbons, substituted hydrocarbons, cyano, alkoxy, phenoxy, amino, sulfo or nitro groups, and n is an integer representing the degree of polymerization.

Particular examples of $R_1$, $R_2$, $R_3$ and $R_4$ in the formula [representing the polyphenylene oxides employed in the present invention include hydrogen, chlorine, bromine and iodine atoms, and methyl, ethyl, propyl, allyl, phenyl, benzyl, methylbenzyl, chloromethyl, bromomethyl, cyanoethyl, cyano, methoxy, ethoxy, phenoxy and nitro groups.

Particular examples of the polyphenylene oxides include poly-2,6-dimethyl-1,4-phenylene oxide, poly-2,6-diethyl-1,4-phenylene oxide, poly-2,6-dipropyl-1,4-phenylene oxide, poly-2,6-dimethoxy-1,4-phenylene oxide, poly-2,6-dichloromethyl-1,4-phenylene oxide, poly-2,6-dibromomethyl-1,4-phenylene oxide, poly-2,6-diphenyl-1,4-phenylene oxide, poly-2,6-ditolyl-1,4-phenylene oxide, poly-2,6-dichloro-1,4-phenylene oxide and poly-2,5-dimethyl-1,4-phenylene oxide.

The styrene polymer used in the present invention contains at least 25 percent by weight of recurring units derived from a compound represented by the general formula,

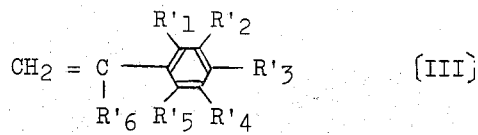

wherein $R'_1$, $R'_2$, $R'_3$, $R'_4$ and $R'_5$ are individually hydrogen or halogen atoms, or cyano, nitro, hydroxy, amino, carboxyl, vinyl, alkyl or substituted alkyl, aryl or substituted aryl, alkoxy or phenoxy groups, and $R'_6$ is a hydrogen atom or an alkyl group.

Particular examples of $R'_1$, $R'_2$, $R'_3$, $R'_4$ and $R'_5$ in the formula [III] include hydrogen, chlorine, bromine, iodine atoms, and methyl, ethyl, propyl, allyl, phenyl, benzyl, methylbenzyl, chloromethyl, bromomethyl, cyanoethyl, cyano, nitro, amino, methoxy, ethoxy and phenoxy groups.

Particular examples of $R'_6$ in the formula [III] include a hydrogen atom or methyl group.

Examples of the styrene polymer include homopolymer such as polystyrene or polychlorostyrene; modified polystyrene such as high impact rubber-modified polystyrene, and styrene-acrylonitrile copolymer (AS), styrene-α-alkylstyrene copolymer, styrene-acrylonitrile-butadiene copolymer (ABS), ethylene-styrene copolymer (ES), poly-α-methylstyrene and ethylvinylbenzenedivinylbenzene copolymer.

Among these, polystyrene, high impact rubber-modified polystyrene, ABS resin or AS resin is preferably used.

The graft copolymer (2) used in the present invention is a modified polyphenylene oxide comprising 20–80 parts by weight of a styrene polymer and 80–20 parts by weight of a polyphenylene oxide, which is obtained, for example, by oxidative polymerizing a phenol compound represented by the general formula,

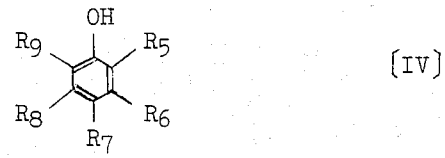

wherein $R_5$, $R_6$, $R_7$, $R_8$ and $R_9$ are individually hydrogen or halogen atoms, or hydrocarbons or substituted hydrocarbons, phenoxy, alkoxy, cyano, nitro, amino and sulfo groups, but at least one of $R_5$, $R_6$, $R_7$, $R_8$ and $R_9$ is a hydrogen atom and further at least one thereof is other then the hydrogen or halogen atoms, in the presence of above-mentioned styrene by using an oxidative coupling polymerization initiator.

Particular examples of $R_5$, $R_6$, $R_7$, $R_8$ and $R_9$ in the formula [IV] include hydrogen, chlorine, and bromine atoms, and methyl, ethyl, propyl, chloromethyl, chloroethyl, bromomethyl, methoxy, ethoxy, phenyl, nitro, amino and sulfo groups.

Particular examples of the phenol compounds include 2-methylphenol, 3-methylphenol, 2-ethylphenol, 2,6-dimethylphenol, 2-methyl-6-ethylphenol, 2,6-diphenylphenol, 2,4-dibenzylphenol, 4-bromomethylphenol, 2-methyl-6-bromophenol, 3-methoxyphenol, 2,5-dimethylphenol, and 2,6-dichloromethoxyphenol.

Particular examples of the oxidative coupling polymerization initiators include copper salt-tertiary amine catalyst (Japanese Patent Publication Nos. 18692/61 and 14645/62), basic cupric salt-amine catalyst (Japanese Patent Publication Nos. 29373/64, 16423/70 and 22269/70), manganese compound-tertiary amine catalyst (Japanese Patent Publication No. 3195/72), mangane-tertiary amine-alcohol catalyst (Dutch Patent Application No. 68,01524), Manganes-primary amine-alcohol catalyst (Belgiun Pat. No. 760,344), copper salt-amine-alcohol catalyst (Dutch Patent Application No. 67,06964), cobalt-amine catalyst (Dutch Patent Application No. 64,03375), alkali metal ferricyanide-amine catalyst (U.S. Pat. No. 3,342,892), copper-amine-alkali metal phenolate catalyst (U.S. Pat. No. 3,442,855).

The amounts of the phosphoric acid ester and antimony trioxide used are specific in the present invention. The amount of phosphoric acid ester is 0.5 to 10, and preferably 1 to 5 parts by weight, and the amount of antimony trioxide is 0.2 to 5, and preferably 0.3 to 3 parts by weight, based on 100 parts by weight of the modified polyphenylene oxide. When the amounts of the phosphoric acid ester and antimony trioxide are used in excess of the upper limits, only a molding material lowered in heat resistance is obtained, and when those are used in less than the lower limits, no desirable flame-resistance can be obtained.

It is preferable in the invention to select an appropriate ratio of the amounts of antimony trioxide to the phosphoric acid ester used. While the ratio is somewhat varied depending upon the kind of the phosphoric acid ester, it lies in 5–100, especially 7–90 parts by weight of antimony trioxide, to 100 parts by weight of the phosphoric acid ester.

The addition of the phosphoric acid ester and antimony trioxide to the modified polyphenylene oxide may be carried out by any method which is usually used industrially. For example, they are added to the modified polyphenylene oxide in the form of powder or granule in a Henschel-type mixer, and then milled by means of an extruder or a roller mill. Alternatively, they may be added to a solution of the modified polyphenylene oxide in an appropriate solvent, and then the flame-retarded composition comprising the modified polyphenylene oxide is isolated from the solution.

It will be noted that the addition of stabilizers, lubricants, pigments, etc., in an amount usually used industrially, to the present composition does not interfere with the object of the invention.

The invention will be illustrated below with reference to Examples which are presented merely as examples, and an appropriate modification may be made within the scope of this invention.

In the Examples, the flame resistance test is carried out by the Self-Extinguishing Test method according to the Underwriters Laboratory Subject 94, and Oxygen Index is measured according to ASTM D-2863-1970. The impact strength is Notch Izod impact strength measured at 20°C according to ASTM-D256, and the softening temperature is Vicat softening point determined according to ASTM-D1525.

EXAMPLE 1

Various compounds were added in various proportions to a modified polyphenylene oxide powder composed of 54.0 percent by weight of 2,6-dimethyl-1,4-phenylene oxide component, 41.0 percent by weight of styrene component, and 5.0 percent by weight of butadiene component, which is obtained by polymerizing in a dispersed state styrene in the presence of polybutadiene and poly-2,6-dimethyl-1,4-phenylene oxide having an intrinsic viscosity of 0.52 dl/g as measured in chloroform at 25°C. Each of the mixture was milled for 10 minutes on a two-roller mill adjusted to a surface temperature of 210°C. The resulting composition was compression-molded at 250°C for 10 minutes to obtain two sheets each having a thickness of 1.6 mm and 3.0 mm. The sheet having a thickness of 1.6 mm was cut into a test sheet of 127 mm in length and 12.7 mm in width. The test sheet was subjected to the Self-Extinguishing Test method according to the Underwriters Laboratory Subject 94 to determine the combustion time of the sample. Each sample sheet specified in test methods for measuring Oxygen Index, Vicat softening point and Izod impact strength, respectively, was prepared by cutting the sheet having a thickness of 3.0 mm. The tests were carried out on the sample sheets to determine each of the measures. Furthermore, the resulting composition was injection-molded by means of an injection molding machine, NIKKO-ANKERWERK V-15-75 sold by The Japan Steel Works Ltd. under the condition of injection pressure at 815 kg/cm², mold temperature at 80°C, and cylinder temperature at 240°–280°C to detect the presence of the so-called Silver Streak and foam in the resulting molding, which are caused by the decomposition and sublimation of the compounds added.

The following Table 1 shows the test results in case of the joint use of phosphoric acid ester and antimony trioxide, and Table 2 shows the Reference Example in case of the use of phosphoric acid ester or antimony trioxide alone as well as in case of the joint use of Dechlorane Plus 515 and antimony trioxide.

As is clear in the tables, the modified polyphenylene oxide is given higher flame resistance, retaining good mechanical and thermal properties with good appearance of the molding in case of the joint use of the phosphoric acid ester and antimony trioxide than in the other cases, where the effect is not displayed.

Table 1

| Additives | | U.L.-94 Burning Test | | | | | | |
|---|---|---|---|---|---|---|---|---|
| Kinds | % by wt. | Average combustion time (second) | Maximum Combustion time (second) | Dripping Property | Oxygen Index | Vicat Softening Temp. (°C) | Izod Impact Strength (kg·cm/cm²) | Appearance of molding |
| Triphenyl phosphate | 2 | 18.5 | 30 | no dripping | 28.0 | 152.4 | 6.3 | good |
| Antimony trioxide | 1 | | | | | | | |
| Triphenyl phosphate | 3 | 16.5 | 29 | no dripping | 29.0 | 149.5 | 6.3 | good |
| Antimony trioxide | 1.5 | | | | | | | |

Table 2

| Additives | | U.L.-94 Burning Test | | | | | | |
|---|---|---|---|---|---|---|---|---|
| Kinds | % by wt. | Average Combustion time (sec.) | Maximum Combustion time (sec.) | Dripping Property | Oxygen Index | Vicat Softening Temp. (°C) | Izod Impact Strength (Kg·cm/cm²) | Appearance of molding |
| Not added | — | burned | burned | dripping | 24.5 | 160.2 | 7.0 | good |
| Dechlorane plus 515 | 3 | 21.4 | 38 | no dripping | 25.0 | 156.6 | 5.6 | silver streaks are observed |
| Antimony trioxide | 1.5 | | | | | | | |

Table 2—Continued

| Additives | | U.L.-94 Burning Test | | | | | | |
|---|---|---|---|---|---|---|---|---|
| Kinds | % by wt. | Average Combustion time (sec.) | Maximum Combustion time (sec.) | Dripping Property | Oxygen Index | Vicat Softening Temp. (°C) | Izod Impact Strength (Kg·cm/cm²) | Appearance of molding |
| Triphenyl phosphate | 1.5 | burned | burned | dripping | 25.0 | 158.1 | 4.9 | good |
| Triphenyl phosphate | 2 | burned | burned | dripping | 25.0 | 155.0 | 5.7 | good |
| Triphenyl phosphate | 3 | burned | burned | dripping | 25.0 | 151.5 | 6.5 | good |
| Antimony trioxide | 1.5 | burned | burned | dripping | 25.5 | 155.7 | 3.2 | good |
| Antimony trioxide | 3 | burned | burned | dripping | 26.5 | 154.6 | 3.1 | good |

EXAMPLE 2

Example 1 was repeated, except that the sum of the addition amounts of triphenyl phosphate and antimony trioxide used was fixed to 4 percent by weight based on the modified polyphenylene oxide, but altering the proportion of the two compounds to be added.

The results are shown in Table 3.

Table 3

| $\frac{\text{Antimony trioxide (g)}}{\text{Triphenyl phosphate (g)}} \times 100\%$ | U.L.-94 Burning Test | | | | | |
|---|---|---|---|---|---|---|
| | Average combustion time (sec.) | Maximum combustion time (sec.) | Dripping property | Oxygen index | Vicat softening temp. (°c) | Izod impact strength (kg·cm/cm²) |
| 5 | 20.0 | 41.0 | Partial dripping | 26.5 | 145.9 | 6.39 |
| 25 | 19.0 | 24.0 | Partial dripping | 27.5 | 146.8 | 5.38 |
| 60 | 24.4 | 30.0 | no dripping | 28.0 | 151.0 | 5.40 |

EXAMPLE 3

Various compounds were added in various proportions to a modified polyphenylene oxide obtained by blending 56 parts by weight of poly-2,6-dimethyl-1,4-phenylene oxide having an intrinsic viscosity of 0.55 dl/g as measured in chloroform at 25°C with 44 parts by weight of polystyrene having an intrinsic viscosity of 0.72 dl/g as measured in toluene at 30°C. Each of the mixture was milled for 10 minutes on a two-roller mill adjusted to a surface temperature of 210°C. The resulting composition was compression-molded at 250°C for 10 minutes to obtain two sheets each having a thickness of 1.6 mm and 3.0 mm. The sheet having a thickness of 1.6 mm was cut into a test sheet of 127 mm in length and 12.7 mm in width. The test sheet was subjected to the Self-Extinguishing Test Method according to the Underwriters Laboratory Subject 94 to determine the combustion time of the sample. Each sample sheet specified in test method for measuring Oxygen Index, Vicat softening point and Izod impact strength, respectively, was prepared by cutting the sheet having a thickness of 3.0 mm. The tests were carried out on the sample sheets to determine each of the measures. Furthermore, the resulting composition was injection-molded by means of an injection molding machine NIKKO-ANKERWERK V-15-75 under the condition of injection pressure at 815 kg/cm², mold temperature at 80°C, and cylinder temperature at 240°–280°C to detect the presence of the so-called Silver Streak and form in the resulting molding, which are caused by the decomposition and sublimation of the compounds added.

The following Table 4 shows the test results in case of the joint use of phosphoric acid ester and antimony trioxide, and shows the contrasting test results in case of the use of phosphoric acid ester or antimony trioxide alone as well as in case of the joint use of Dechlororane Plus 515 and antimony trioxide.

Table 4

| Additives | | U.L.-94 Burning Test | | | | | | |
|---|---|---|---|---|---|---|---|---|
| Kinds | % by wt. | Average combustion time (sec.) | Maximum combustion time (sec.) | Dripping property | Oxygen index | Vicat softening temp. (°C) | Izod impact strength (kg·cm/cm²) | Appearance of molding |
| Triphenyl phosphate | 2 | 17.0 | 28 | No dripping | 28.0 | 149.0 | 4.5 | good |
| Antimony trioxide | 1 | | | | | | | |

Table 4—Continued

| | Additives | | U.L.-94 Burning Test | | | | | | |
|---|---|---|---|---|---|---|---|---|---|
| | Kinds | % by wt. | Average combustion time (sec.) | Maximum combustion time (sec.) | Dripping property | Oxygen index | Vicat softening temp. (°C) | Izod impact strength (kg·cm/cm²) | Appearance of molding |
| Example 3 | Triphenyl phosphate | 3 | 15.5 | 27 | No dripping | 28.5 | 146.5 | 4.5 | good |
| | Antimony trioxide | 1.5 | | | | | | | |
| | Not added | — | burned | burned | dripping | 24.5 | 160.0 | 4.0 | good |
| | Dechlorane plus 515 | 3 | 20.5 | 30 | No dripping | 25.0 | 155.0 | 3.0 | silver streaks are observed |
| | Antimony trioxide | 1.5 | | | | | | | |
| | Triphenyl phosphate | 1.5 | burned | burned | dripping | 25.0 | 157.0 | 4.2 | good |
| | Triphenyl phosphate | 2 | burned | burned | dripping | 25.0 | 154.0 | 4.5 | good |
| Reference example | Triphenyl phosphate | 3 | burned | burned | dripping | 25.0 | 150.0 | 5.0 | good |
| | Antimony trioxide | 1.5 | burned | burned | dripping | 25.5 | 156.0 | 3.0 | good |
| | Antimony trioxide | 3 | burned | burned | dripping | 26.5 | 155.5 | 3.0 | good |

EXAMPLE 4

Example 1 was repeated provided that the sum of the addition amounts of triphenyl phosphate and antimony trioxide used was fixed to 4 percent by weight based on the same modified polyphenylene oxide used in Example 1, but altering the proportion of the two compounds to be added.

The results are shown in Table 5.

Table 5

| Antimony trioxide (g) / Triphenyl phosphate (g) × 100 % | U.L.-94 Burning Test | | | Oxygen index | Vicat softening temp. (°C) | Izod impact strength (kg·cm/cm²) |
|---|---|---|---|---|---|---|
| | Average combustion time (sec.) | Maximum combustion time (sec.) | Dripping property | | | |
| 5 | 21.0 | 42.0 | Partial dripping | 27.0 | 146.0 | 4.5 |
| 25 | 20.0 | 30.0 | Partial dripping | 27.5 | 147.1 | 4.3 |
| 60 | 19.5 | 28.0 | No dripping | 28.0 | 152.5 | 3.5 | pounds were added in various proportion to a modified polyphenylene oxide obtained by blending 52 parts by weight of poly-2,6-dimethyl-1,4-phenylene oxide having an intrinsic viscosity of 0.55 dl/g as measured in chloroform at 25°C with 48 parts by weight of high impact rubber-modified polystyrene (butadiene rubber content; 10.2 percent by weight).

The results are shown in Table 6.

Table 6

| | Additives | | U.L.-94 Burning Test | | | | | | |
|---|---|---|---|---|---|---|---|---|---|
| | Kinds | % by wt. | Average combustion time (sec.) | Maximum combustion time (sec.) | Dripping property | Oxygen index | Vicat softening temp. (°C) | Izod impact strength (kg·cm/cm²) | Appearance of molding |
| Example 5 | Tributyl phosphate | 2 | 18.5 | 28.0 | no dripping | 28.5 | 147.0 | 10.5 | good |
| | Antimony trioxide | 1 | | | | | | | |
| | Tributyl phosphate | 3 | 14.7 | 25.0 | no dripping | 29.0 | 142.5 | 9.5 | good |
| | Antimony trioxide | 1.5 | | | | | | | |
| | Not added | — | burned | burned | dripping | 24.5 | 156.0 | 11.0 | good |
| | Tributyl phosphate | 2 | burned | burned | dripping | 25.0 | 148.0 | 12.0 | good |
| Reference Example | Tributyl phosphate | 3 | burned | burned | dripping | 25.0 | 143.0 | 11.5 | good |
| | Antimony trioxide | 1.5 | burned | burned | dripping | 25.5 | 154.0 | 8.0 | good |

EXAMPLE 5

Example 3 was repeated, except that various com-

EXAMPLE 6

Example 3 was repeated, except that various compounds were added in various proportions to a modified polyphenylene oxide obtained by blending 58 parts by weight of poly-2,6-dimethyl-1,4-phenylene oxide having an intrinsic viscosity of 0.52 dl/g as measured in chloroform at 25°C with 42 parts by weight of acrylonitrile-styrene-butadiene copolymer (acrylonitrile content, 20 parts by weight, styrene content, 70 parts by weight and butadiene content, 10 parts by weight).

The results are shown in Table 7.

propylamine and 1.0 g of cupric chloride. While introducing oxygen into the reaction mixture, the reaction was carried out at 30°C for 4 hours with stirring. After completion of the reaction, the reaction mixture thus obtained was charged into a large amount of methanol containing a small amount of hydrochloric acid and the precipitate formed was filtered and washed with methanol and water. Thereafter, the precipitate was dried to obtain 50.3 g of white polymer composition powder.

Table 7

|  | Additives | | U.L.-94 Burning Test | | | | | | |
|---|---|---|---|---|---|---|---|---|---|
|  | Kinds | % by wt. | Average combustion time (sec.) | Maximum combustion time (sec.) | Dripping property | Oxygen index | Vicat softening temp. (°C) | Izod impact strength (kg·cm/cm²) | Appearance of molding |
| Example 6 | Tricresyl phosphate | 2 | 16.5 | 29.0 | no dripping | 29.0 | 154.3 | 12.0 | good |
|  | Antimony trioxide | 1 | | | | | | | |
|  | Tricresyl phosphate | 3 | 14.5 | 28.5 | no dripping | 29.5 | 150.0 | 11.5 | good |
|  | Antimony trioxide | 1.5 | | | | | | | |
| Reference Example | Not added | — | burned | burned | dripping | 25.0 | 162.0 | 13.0 | good |
|  | Tricresyl phosphate | 2 | burned | burned | dripping | 25.5 | 156.5 | 12.0 | good |
|  | Tricresyl phosphate | 3 | burned | burned | dripping | 25.5 | 152.5 | 11.0 | good |
|  | Antimony trioxide | 1.5 | burned | burned | dripping | 25.0 | 160.0 | 10.5 | good |

EXAMPLE 7

In a four-necked flask equipped with a thermometer, a reflux condenser, a dropping funnel and a stirrer, 200 g of toluene, 30 g of 2,6-xylenol and 22 g of polystyrene having an intrinsic viscosity of 0.94 dl/g as measured in chloroform at 25°C were charged and the polymers were dissolved. To this solution were added 51 g of a solution dissolved in 80 g of triethylamine, 50 g of n-

Example 3 was repeated, except that the modified polyphenylene oxide thus obtained was used.

The results are shown in Table 8.

Table 8

|  | Additives | | U.L.-94 Burning Test | | | | | | |
|---|---|---|---|---|---|---|---|---|---|
|  | Kinds | % by wt. | Average combustion time (sec.) | Maximum combustion time (sec.) | Dripping property | Oxygen index | Vicat softening temp. (°C) | Izod impact strength (kg·cm/cm²) | Appearance of molding |
| Example 7 | Tributyl phosphate | 2 | 16.5 | 26.5 | no dripping | 29.5 | 153.0 | 5.0 | good |
|  | Antimony trioxide | 1 | | | | | | | |
|  | Tributyl phosphate | 3 | 13.5 | 23.2 | no dripping | 29.8 | 147.5 | 4.8 | good |
|  | Antimony trioxide | 1.5 | | | | | | | |
| Reference Example | Not added | — | burned | burned | dripping | 25.0 | 162.0 | 4.3 | good |
|  | Tributyl phosphate | 2 | burned | burned | dripping | 25.5 | 153.5 | 4.9 | good |
|  | Tributyl phosphate | 3 | burned | burned | dripping | 25.5 | 148.5 | 5.3 | good |
|  | Antimony trioxide | 1.5 | burned | burned | dripping | 26.0 | 158.5 | 3.2 | good |

EXAMPLE 8

Example 1 was repeated, except that various compounds were added in various proportions to a modified polyphenylene oxide powder composed of 56 percent by weight of 2,6-dimethyl-1,4-phenylene oxide component and 44 percent by weight of styrene component, which was obtained by polymerizing in a dispersed state styrene in the presence of poly-2,6-dimethyl-1,4-phenylene oxide having an intrinsic viscosity of 0.55 dl/g as measured in chloroform at 25°C.

The results are shown in Table 9.

Table 9

|  | Additive | | U.L.-94 Burning Test | | | | | | |
|---|---|---|---|---|---|---|---|---|---|
|  | Kinds | % by wt. | Average combustion time (sec.) | Maximum combustion time (sec.) | Dripping property | Oxygen index | Vicat softening temp. (°C) | Izod impact strength (kg·cm/cm$^2$) | Appearance of molding |
| Example 8 | Tributyl phosphate | 2 | 16.5 | 28 | no dripping | 28.5 | 155.3 | 4.0 | good |
|  | Antimony trioxide | 1 | | | | | | | |
|  | Tributyl phosphate | 3 | 19.5 | 27 | no dripping | 29.0 | 151.6 | 3.6 | good |
|  | Antimony trioxide | 1 | | | | | | | |
| Reference Example | Not added | — | burned | burned | dripping | 25.0 | 162.0 | 4.0 | good |
|  | Tributyl phosphate | 2 | burned | burned | dripping | 25.5 | 156.5 | 5.1 | good |
|  | Tricresyl phosphate | 3 | burned | burned | dripping | 26.0 | 152.4 | 4.3 | good |

As is clear in the tables, the modified polyphenylene oxide is given higher flame resistance, retaining good mechanical and thermal properties with good appearance of the molding in case of the joint use of the phosphoric acid ester and antimony trioxide than in the other case, where the effect is not displayed.

What is claimed is:

1. A flame-retarded composition of a modified polyphenylene oxide comprising 100 parts by weight of a modified polyphenylene oxide obtained by graft polymerizing in a dispersed state a styrene monomer in the presence of a polyphenylene oxide with a rubbery polymer, 0.5–10 parts by weight of at least one phosphoric acid ester having a boiling point of 200°C or higher, of the formula,

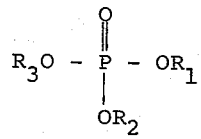

wherein $R_1$, $R_2$ and $R_3$ are individually an aliphatic or aromatic hydrocarbon group having 2 to 20 carbon atoms, and 0.2–5 parts by weight of antimony trioxide.

2. A flame-retarded composition of a modified polyphenylene oxide according to claim 1, wherein the phosphoric acid ester is triethyl phosphate, tripropyl phosphate, tributyl phosphate, tripentyl phosphate, trihexyl phosphate, trioctyl phosphate, tridecyl phosphate, tridodecyl phosphate, trioctadecyl phosphate, triphenyl phosphate, tribenzyl phosphate, tricresyl phosphate, phenyl dibenzyl phosphate, diphenyl pentyl phosphate, cresyl diphenyl phosphate, octyl diphenyl phosphate or the mixture thereof.

3. A flame-retarded composition of a modified polyphenylene oxide according to claim 1, wherein the amount of the phosphoric acid ester is 1–5 parts by weight.

4. A flame-retarded composition of a modified polyphenylene oxide according to claim 1, wherein the amount of antimony oxide is 0.3–3 parts by weight.

5. A flame-retarded composition of a modified polyphenylene oxide according to claim 1, wherein the ratio of the amounts of antimony trioxide to the phosphoric acid ester is 5–100:100.

6. A flame-retarded composition of a modified polyphenylene oxide according to claim 1, wherein the ratio is 7–90:100.

7. A flame-retarded composition of a modified polyphenylene oxide according to claim 2, wherein the phosphoric acid ester is triphenyl phosphate.

8. A flame-retarded composition of a modified polyphenylene oxide according to claim 1, wherein the polyphenylene oxide is poly-2,6-dimethyl-1,4-phenylene oxide, poly-2,6-diethyl-1,4-phenylene oxide, poly-2,6-dipropyl-1,4-phenylene oxide, poly-2,6-dimethoxy-1,4-phenylene oxide, poly-2,6-dichloromethyl-1,4-phenylene oxide, poly-2,6-dibromomethyl-1,4-phenylene oxide, poly-2,6-diphenyl-1,4-phenylene oxide, poly-2,6-ditolyl-1,4-phenylene oxide, poly-2,6-dichloro-1,4-phenylene oxide or poly-2,5-dimethyl-1,4-phenylene oxide.

* * * * *